US009848584B1

(12) United States Patent  
Alden

(10) Patent No.: US 9,848,584 B1  
(45) Date of Patent: Dec. 26, 2017

(54) PET LEASH BOOSTER ADAPTER

(71) Applicant: Robert Alden, Keene, NH (US)

(72) Inventor: Robert Alden, Keene, NH (US)

( * ) Notice: Subject to any disclaimer, the term of this patent is extended or adjusted under 35 U.S.C. 154(b) by 383 days.

(21) Appl. No.: 14/794,230

(22) Filed: Jul. 8, 2015

Related U.S. Application Data

(60) Provisional application No. 62/021,852, filed on Jul. 8, 2014.

(51) Int. Cl.  
*A01K 27/00* (2006.01)

(52) U.S. Cl.  
CPC .................. *A01K 27/005* (2013.01)

(58) Field of Classification Search  
CPC .... A01K 27/005; A01K 27/003; A01K 27/00; A01K 27/006  
USPC ........ 119/798, 797, 795, 792, 769, 770, 793  
See application file for complete search history.

(56) References Cited

U.S. PATENT DOCUMENTS

| | | | | |
|---|---|---|---|---|
| 5,038,719 A * | 8/1991 | McDonough | .......... | A01K 27/00 119/772 |
| 5,146,876 A * | 9/1992 | McPhail | .............. | A01K 27/005 119/798 |
| 5,632,234 A * | 5/1997 | Parker | ................. | A01K 27/003 119/795 |
| 6,675,742 B1 * | 1/2004 | Shiraki | ................ | A01K 27/003 119/793 |
| 6,971,334 B1 * | 12/2005 | Livesay | ............... | A01K 27/003 119/792 |
| 6,990,929 B2 * | 1/2006 | Young, III | .......... | A01K 27/005 119/797 |
| 7,188,585 B1 * | 3/2007 | Carter | .................. | A01K 27/005 119/798 |
| 7,418,926 B2 * | 9/2008 | Kung | ................... | A01K 27/005 119/769 |
| 7,467,604 B1 * | 12/2008 | Werner | .................. | A01K 27/00 119/770 |
| 7,779,789 B2 * | 8/2010 | Tanaya | ................... | A01K 27/00 119/770 |
| 8,322,311 B2 * | 12/2012 | Gould | .................... | A01K 27/00 119/792 |
| 8,505,495 B2 * | 8/2013 | Wang | ................... | A01K 27/003 119/797 |
| 2008/0072849 A1 * | 3/2008 | Henderson | ............ | A01K 27/00 119/792 |
| 2015/0053145 A1 * | 2/2015 | Miksovsky | .......... | A01K 27/003 119/772 |
| 2015/0237831 A1 * | 8/2015 | Beck | ..................... | A01K 27/003 119/795 |
| 2017/0142934 A1 * | 5/2017 | Evans | .................. | A01K 27/003 |

* cited by examiner

*Primary Examiner* — Yvonne Abbott-Lewis  
(74) *Attorney, Agent, or Firm* — Coolidge & Graves, PLLC; Daniel S. Coolidge

(57) ABSTRACT

A leash booster adapter is descripted which is attach to each end of a section of pet leash, and comprises an elastic member between shorter than the pet leash section to which it attached. In use, the device applies progressive resistance to the pet proportional to the stretching force provided by the pet pulling on the leash: the harder the pet pulls, the more resistance is felt. Rather that a hard jerk felt by the pet when it pulls, a gentle resistance is first felt, increasing in force as the pet pulls harder.

14 Claims, 3 Drawing Sheets

PET LEASH BOOSTER ADAPTER

This application claims priority from provisional patent application No. 62/021,852 filed Jul. 8, 2014, which is incorporated by reference.

TECHNICAL FIELD

The present invention relates to pet products, and more particularly to leashes and restraints.

BACKGROUND OF THE INVENTION

Walking a pet on a retractable leash can be problematic with pets that pull or lunge. Similarly, a pet tied to a run may leap against the restraint. Because the restraint is inelastic, the pet can be subject to a jerking force on the pet's neck. This jerking can result in neck injuries to the pet if on a collar, and other injuries even if on a harness, such as muscle tears. A large dog lunging can put repeated strain or shock on the pet owner's arm, wrist or shoulder.

What is needed is a device that progressively encourages the pet not to strain against the leash or restraint, in a safe and less injury prone manner than just a leash. By progressive, what is meant is that the harder the pet may pull, the more the pet should be encouraged not to pull.

BRIEF SUMMARY

In one embodiment according to the principles of the present invention, the leash booster adapter comprises an assemble of an elastic member, a means of connecting each end of the elastic member to two attachment points on a leash, respectively. In a preferred embodiment, the elastic member is from 3 to 14 inches long, and sized to have a spring constant appropriate for the size and weight of the pet on which the leash booster adapter is to be used. Using means such as, for example, a bibb washer through which a loop of leash is pulled and secured over the washer with a cow hitch, two point attachment points may be installed on a leash, such as a retractable member leash.

The elastic member may, in yet another embodiment, be fitted with grommets on each end to facilitate attachment to the attachment points. In yet another embodiment, the grommets may be installed over a d-ring adapter with the wire end protruding from the end of the member and secured with a rivet, or a nut and bolt.

Instead of a bibb washer, other materials may be used latex tubing such as surgical tubing. Other elastic materials may be used, such as rubber, shock or bungee member or even a spring It is preferable that the two attachment points be farther apart on the leash than the combined length of the elastic member and the means to attach to the leash, and no more than twice the length of the elastic member.

Connecting means may comprise, in exemplary embodiments, the elastic member may be made from latex tubing such as surgical tubing. Other elastic materials may be used, such as rubber, shock or bungee member or even a spring.

Other than a bibb washer, other embodiments may comprise a metal washer, plastic washer, faucet washer, rubber washer, metal ring, quick link with a spring closure, a quick link with a threaded closure and a shackle for the attachment points.

In yet another embodiment, the present invention comprises a method of adapting a pet leash to provide gentle and progressive restraint against pet pulling by connecting with connecting means a length of elastic material between two means of attachment on a pet leash.

BRIEF DESCRIPTION OF THE DRAWINGS

These and other features and advantages of the present invention will be better understood by reading the following detailed description, taken together with the drawings wherein.

Like reference numbers and designations in the various drawings indicate like elements.

DETAILED DESCRIPTION

The details of one or more embodiments of the invention are set forth in the accompanying drawings and the description below. Other features and advantages of the invention will become apparent from the description, the drawings, and the claims.

According to the principles of the present invention, a length of elastic material is connected at one end to a first point on a leash, and at the other end connected to a second point on the leash father away from the first point than the length of the elastic member, this making a "leash loop" (shown in FIG. 3 as leash loop 70) around the elastic member. The size of the loop establishes the maximum extension of the elastic member when the pet attempts to strain on the leash, and provides a failsafe against the failure of the elastic member.

In use, when the pet is connected to the leash and begins to strain on the leash, the elastic member is stretched (allowed to do so by the loop of leash) and gently pulls back on the pet. If the pet pulls harder, the elastic member is stretched further and thus applies greater restraining force, proportional to how hard the pet pulls. If the pet applies enough force that it stretches the elastic member to the length of the leash loop, the strain is taken up strongly by the leash.

In use, the elastic member provides a spring or elastic tension against the pet pulling, increasing tension as the pet pulls harder, the tension being approximately calculated by the spring constant of the elastic member chosen according to the formula $F=-kx$, where F is the force applied by the elastic member, k=the spring constant of the elastic member, and x being the length of stretching applied to the elastic member by the force applied.

Figure 1:
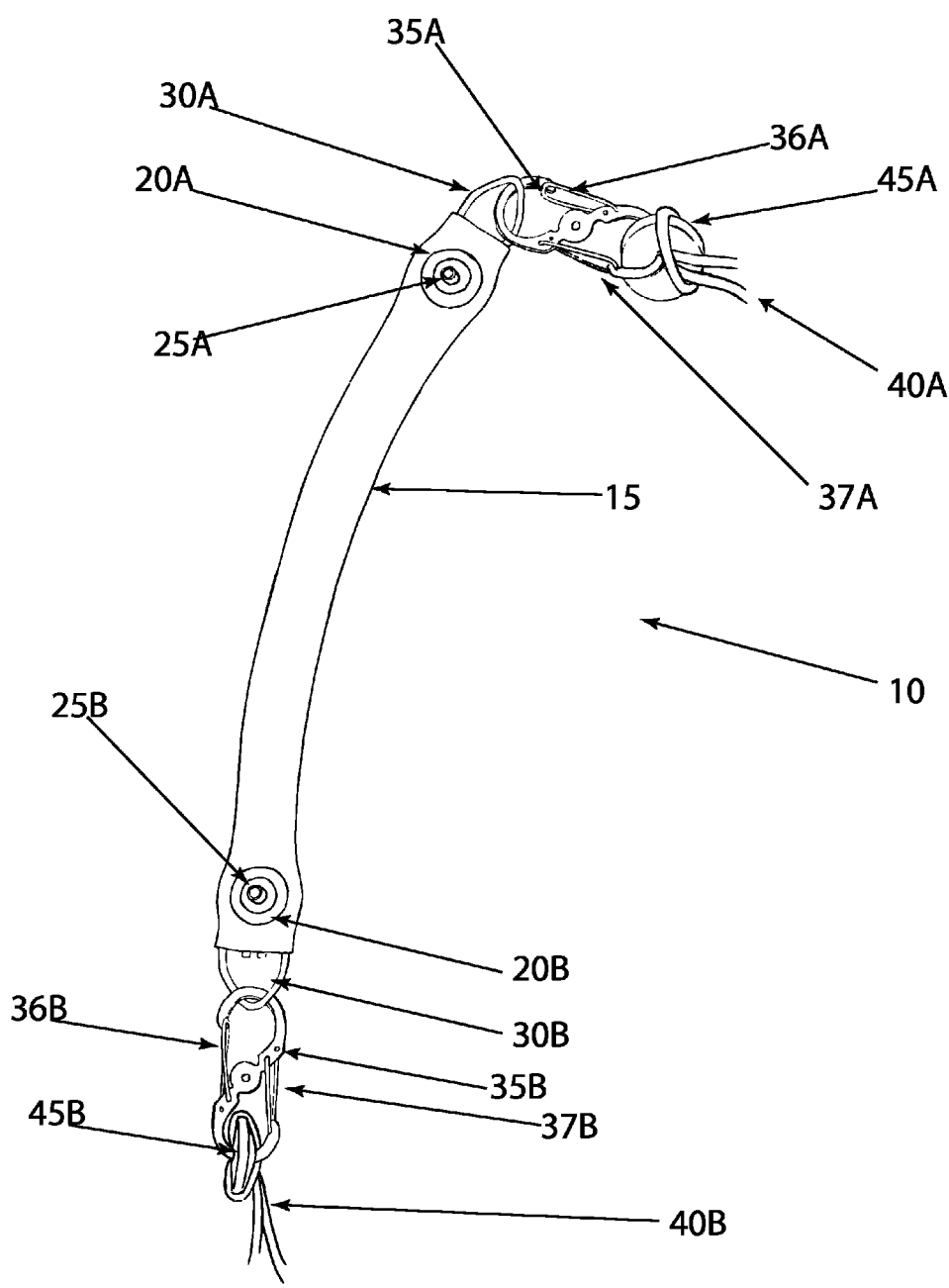
FIG. 1 is a drawing of one embodiment of a leash booster adapter.

Referring to FIG. 1, one exemplary embodiment 10 of a leash booster adapter according to the principles of the present invention is shown. There is a central elastic member 15 made from, for example, latex tubing such as surgical tubing. Other elastic materials may be used, such as rubber, shock or bungee member or even a spring, chosen to give the desired coefficient of elasticity to restrain a pet of given size and for weight. The elastic member should be chosen to have appropriate strength, durability and elasticity when stretched for the size and weight of the pet with which it will be used: for a smaller animal of 8 to 20 pounds, latex tubing from ¼ inch to a half inch has been found appropriate; for a larger, heavier pets, larger size tubing should be chosen. If using another material for the elastic member 15 it should be chosen to give the appropriate pull on a pet of given strength and size. A length for the elastic member of three to fourteen inches has been found most advantageous.

While it is possible to tie the elastic member to the leash at two points, other means of connection have been found more beneficial, secure and easily removable. For example, metal rings (not shown) may be tied to each end of the elastic member 15, and then the leash either tied to the metal rings or attached to the leash with snap hooks or clips. This too suffers from being more difficult to remove and less secure than the referred embodiments described below.

In an embodiment using latex tubing as the elastic member 15, it has been found advantageous to install grommets 20A and 20B at either end of the elastic member 15 as part of the attachment means. While the grommets 20A, 20B will suffice for attachment of the elastic member 15, it has been found to be advantageous to secure D-ring hangers 30a and 30B within grommets 20A and 20B as part of the attachment means attachment points.

Figure 2:
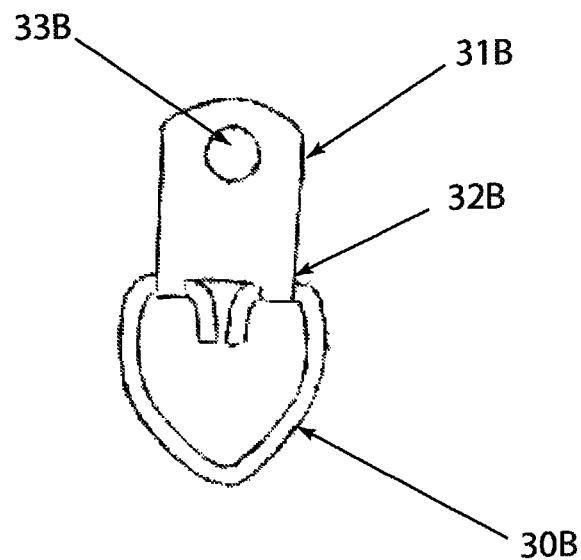
FIG. 2. is a drawing of a d-ring hanger used in one embodiment of a leash booster adapter.

With reference to FIG. 2, one exemplary d-ring hanger is shown. It comprises a stiff metal wire 30B for attachment, a flat metal plate 31B bent at one end around the wire 30B to form a hinge 32B around the wire 30B, and a hole 33B through which a rivet, such as a pop rivet or a nut and bolt to secure the assembly through grommet 20B. Both connection wires 30A and 30B may be so secured with rivets 25A, 25B respectively. The d-ring hangers should be installed so that the wire loop protrudes beyond the ends of the elastic member.

A myriad of other connecting solutions using off-the-shelf hardware and custom hardware will be apparent to those skilled in the art.

To make the leash booster adapter more readily removable from the leash, the embodiment shown in FIG. 1 uses as part of the connecting means double ended carabiners 35A and 35B to connect the elastic member 15 to the leash 40A and 40B. A single carabiner could also be used. The carabiners 35A 35B have spring closures at each end (36A and 37A, and 36B and 37B, respectively) for easy attachment detachment. Many other connecting solutions from standard hardware will be apparent to those skilled in the art, such as, for example, metal S hooks that my be bent to close them, shackles or split links, snap hooks, quick links (both threaded and spring opening) and the like.

The carabiner strength rating will change as will the latex tubing elongation and tensile strength rating as the device is made for use with smaller or larger dogs.

The purpose served by the connecting means, whatever is used, is to connect the elastic member 15 to the leash attachment means, which in this embodiment comprises washers 45A and 45B which have holes in the center of them. At each desired point of attachment to the leash, a small loop is formed in the leash and the loops are pushed through each of washers 45A and 45B respectively, Each loop is brought around the bodies of washers 45A 45B respectively to form a cow hitch knot. A simple hard rubber bibb washer has been found to be particularly suitable. Other forms of leash attachment means may be used beneficially, such as metal rings.

Figure 3:
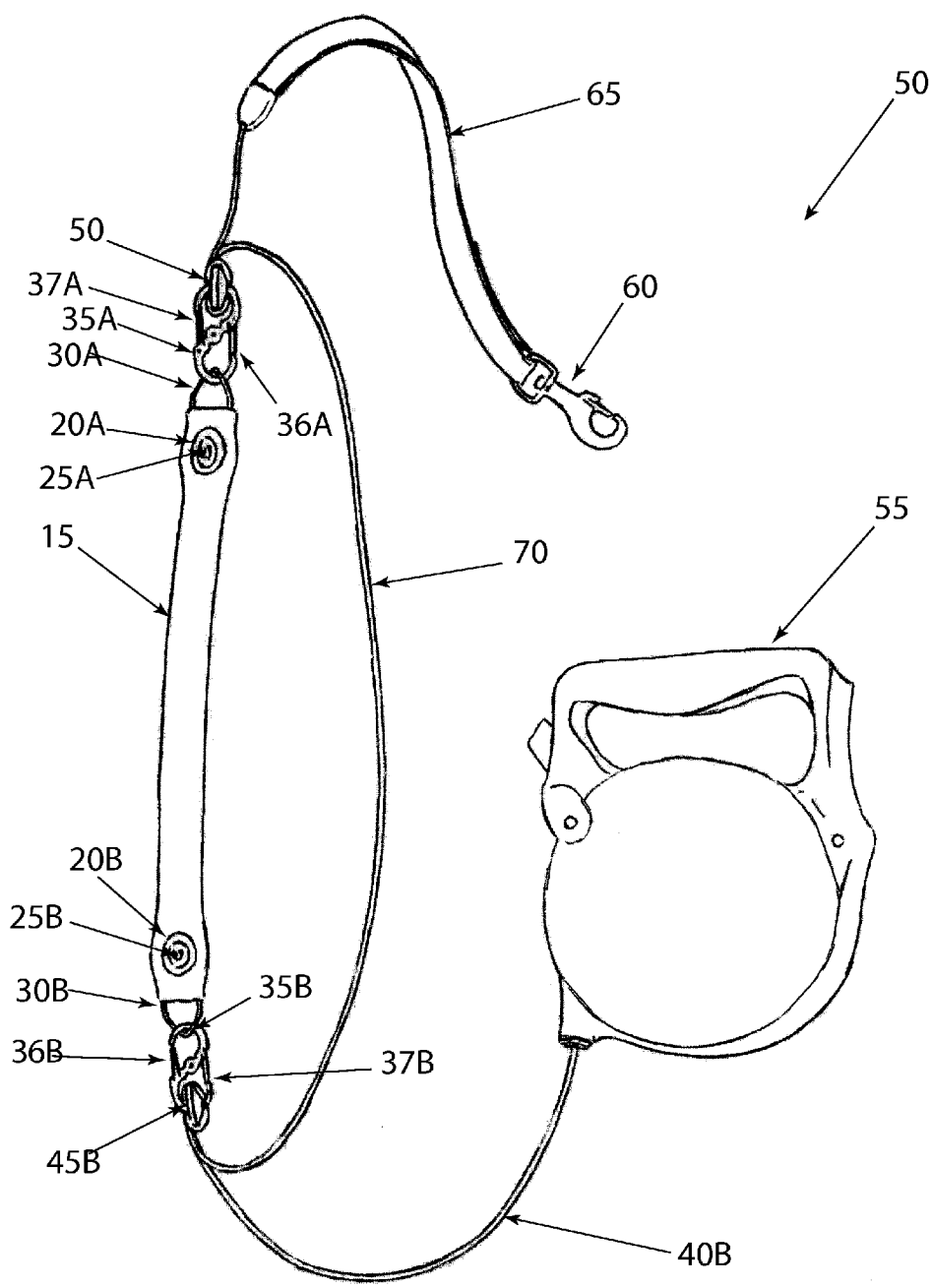
FIG. 3 is a drawing of a leash booster adapter assembled onto an exemplary retractable leash.

FIG. 3 shows an exemplary embodiment 50 of the present invention assembled to a retractable leash 55. The leash member (comprising segments 40B, 70 and 40A) is attached at two points 40A and 40b with cow hitches to the leash booster adapter 10. This forms a leash loop 70. The leash loop 70 should be longer, ideally from 1.25 to 2 times the length of the leash booster adapter 10, depending upon the strength and elasticity of the elastic member 15. The leash loop 70 length should permit the elastic member 15 to stretch when the leash booster adapter 10 is under tension, but short enough to limit the stretching to prevent the elastic member 15 from over-stretching or breaking if the pet pulls too hard.

In a preferred embodiment, the leash booster adapter is attached at one end approximately six to fifteen inches from the pet's collar, and at the second end 20 inches further up the leash. The leash booster adapter 10 thus becomes the "direct line of comfort" while the original leash remains intact for uninterrupted safety.

The double caribiners in this embodiment 35A and 35B are hooked at one end through washers 45A and 45B respectively The invention has been described in terms of particular embodiments. Other embodiments are within the scope of the following claims. For example, the steps of the invention can be performed in a different order and still achieve desirable results. While the present invention has been described in terms of a reel-type retractable member leash, other leash types may be used, with modifications to the attachment means readily apparent to those skilled in the art. Modifications and substitutions by one of ordinary skill in the art are considered to be within the scope of the present invention, which is not to be limited except by the following claims.

The invention claimed is:

1. A leash booster adapter for a pet leash compromising:
   a central elastic member being from 3 to 14 inches long, having a first end and a second end;
   further comprising a first and second connection means and a first and second leash attachment means for connecting said first and second connecting means to said first and second attachment means and said first and second ends, respectively;
   wherein said first attachment is removably attachable to a first position of a pet leash, and said second attachment means is removably attachable to a second position of a pet leash.

2. The leash booster adapter of claim 1 wherein said first and second positions on said pet leash are chosen to be a distance apart at least greater than the length of the said elastic member plus the combined length of said first and second connection means and no farther apart then twice said length.

3. The leash booster adapter of claim 1 wherein the elastic member is made from one chosen from the group consisting of latex tubing, surgical tubing, bungee member, shock member, stretchable rubber and a spring.

4. The leash booster adapter of claim 1 wherein said first and second connection means comprises at least one grommet having a central hole and installed on at least one of said first and second ends of said elastic member.

5. The leash booster adapter of claim 4 wherein said first and second connection means each further comprises at least one chosen from the group consisting of a carabiner, a double carabiner, a metal S hook, a shackle, a bendable split link, a threaded opening split link, a snap hook, a double ended snap hook, a quick link with a spring closure, a quick link with a threaded closure.

6. The leash booster adapter of claim 1 wherein at least one of the first and second attachment means for comprises one selected from the group consisting of metal washer, plastic washer, faucet washer, rubber washer, metal ring, bibb washer, quick link with a spring closure, a quick link with a threaded closure and a shackle.

7. The leash booster adapter of claim 4 wherein said first and second connection means further comprise a first and second d-ring hanger comprising a wire loop and a metal plate connected to said wire loop, said plate comprising a hole centered thereon; and wherein said at least one grommet comprises a first half and a second half, and wherein said hole in said hole in said plate is centered between said grommet first and second halves; and further wherein said hole through said grommet and plate hole has one selected from the group consisting of a rivet, a pop-rivet and a bolt to secure the d-ring hanger in place so that at least a portion of said first and second wire loops extends beyond said first and said second end of said elastic member, respectively.

8. A leash booster adapter comprising:

a central elastic member being from 3 to 14 inches long, having a first end and a second, wherein said elastic member is made from one chosen from the group consisting of latex tubing, surgical tubing, bungee member, shock member, a stretchable rubber and a spring;

wherein said first and second ends of said elastic member has a first grommet and a second grommet, respectively, wherein each of said first and second grommets has a central hole therein and which grommets are installed proximate to said first and second ends, respectively, of said elastic member;

further comprising a first connecting device and a second l connecting device, each of said first and second connecting devices comprising one chosen from the group consisting of a carabiner, a double carabiner, a metal S hook, a shackle, a bendable split link, a threaded opening split link, a snap hook, a double ended snap hook, a quick link with a spring closure, a quick link with a threaded closure, and further wherein said first and second connecting device are each respectively clipped through said holes in said first and second grommets at said first and second ends of said elastic member;

further comprising a first and a second leash attachment device having a hole, each of said first and second leash attachment devices comprising one chosen from the group consisting of a metal washer, plastic washer, faucet washer, rubber washer, metal ring, bibb washer, quick link with a spring closure, a quick link with a threaded closure, and a shackle, and wherein said first and said second leash attachment devices are each respectively clipped through said holes in said first and second leash attachment device respectively.

9. The leash booster adapter of claim 8 wherein said first and second leash attachment devices may be connected to a pet leash at a first connection position and a second connection position, respectively, and wherein said first and second positions on said pet leash are chosen to be a distance apart at least greater than the length of the said elastic member plus the combined length of said first and second leash connecting devices means and no farther apart then twice said combined length.

10. A method of adapting a pet leash to provide gentle and progressive restraint against pet pulling, comprising the steps of:

providing a length of elastic member from 3 to 14 inches long, having a first end and a second end;

providing a first and second leash attachment means;

providing a first and second connecting means for connecting said first and second ends to said first and second leash attachment means;

connecting said first leash attachment means to a first position on a pet leash, and further connecting said second leash attachment means to a second position on a pet leash.

11. The method of claim 10 wherein said first and second positions on said pet leash are chosen to be a distance apart at least greater than the length of the said elastic member plus the combined length of said first and second connecting means and no farther apart then twice said combined length.

12. The method of claim 10 wherein the elastic member is made from one chosen from the group consisting of latex tubing, surgical tubing, bungee member, shock member, stretchable rubber and a spring.

13. The method of claim 10 wherein said first and second attachment means comprises at least one grommet having a central hole and installed on at least one of said first and second ends of said elastic member.

14. The method of claim 10 wherein said first and second connecting means each further comprises at least one chosen from the group consisting of a carabiner, a double carabiner, a metal S hook, a shackle, a bendable split link, a threaded opening split link, a snap hook, a double ended snap hook, a quick link with a spring closure and a quick link with a threaded closure.

* * * * *